United States Patent [19]

Schrader

[11] Patent Number: 4,726,102
[45] Date of Patent: Feb. 23, 1988

[54] PIPE PROTECTOR INSTALLATION DEVICE

[75] Inventor: David M. Schrader, Kingwood, Tex.

[73] Assignee: Hydril Company, Houston, Tex.

[21] Appl. No.: 67,609

[22] Filed: Jun. 26, 1987

[51] Int. Cl.$^4$ .............................................. B23P 19/02
[52] U.S. Cl. .................................................... 29/236
[58] Field of Search ................. 29/450, 453, 252, 235, 29/234, 236; 53/585, 581, 204, 409

[56] References Cited

U.S. PATENT DOCUMENTS

| | | | |
|---|---|---|---|
| 2,263,690 | 11/1941 | Bradley | 29/235 |
| 2,687,566 | 8/1954 | Hall | 29/236 |
| 2,941,283 | 6/1960 | Taylor | 29/236 |

OTHER PUBLICATIONS

Portion of catalog, Bettis Rubber Company, pp. 630-631.

Primary Examiner—Robert C. Watson
Attorney, Agent, or Firm—Vaden, Eickenroht, Thompson & Boulware

[57] ABSTRACT

An improved pipe protector installation device using a hydraulic piston with capacity of 2000 psi to transfer rubber pipe protectors onto transfer sleeves. The improved device uses a spider plate of multiple cooperating wedge shaped shoes with separate springs to surround the shaft holding the pipe protector. The improved device is smaller and lighter weight.

3 Claims, 4 Drawing Figures

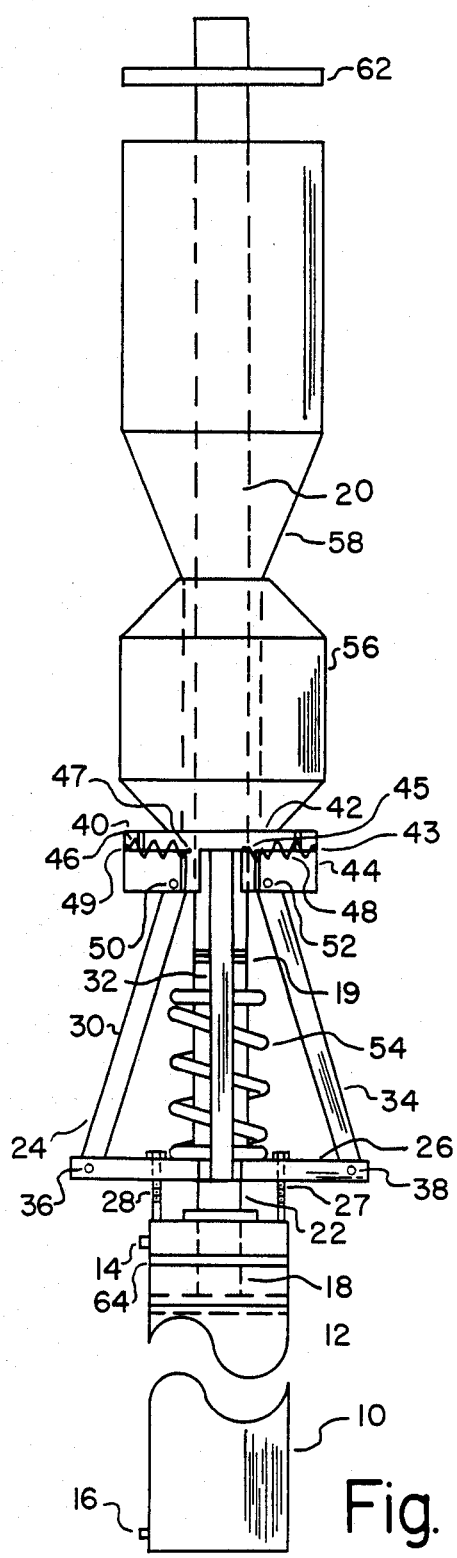
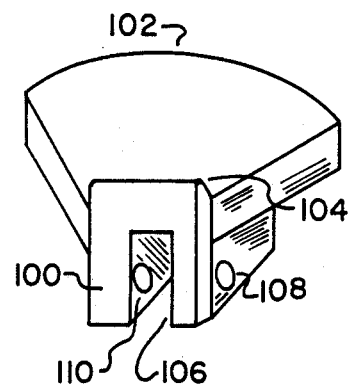
Fig. 1
Fig. 2

PIPE PROTECTOR INSTALLATION DEVICE

BACKGROUND OF THE INVENTION

Pipe used for drilling operations is joined in lengths to form long drill strings. The joints of the pipe are generally threaded. Rubber bumpers sized to fit tightly over a pipe joint are used to protect the joint. The cylindrical pipe protectors have an inner diameter which is generally stretched to be installed on the pipe and fits very tightly around the pipe. Also, rubber pipe protectors have been used at other points on a length of pipe other than at joints to absorb shock.

The pipe protectors are rather large, bulky pieces of rubber. The internal diameter of the pipe protector is usually smaller than the pipe surface to be covered. The installation requires equipment which will stretch and expand the internal diameter of the pipe protector.

Usually the pipe protector is stretched over a short mandrel or transfer sleeve that has a smooth, low friction outer surface. The transfer sleeve has an outer diameter slightly larger than the outer diameter of the joint of the pipe. After stretching the pipe protector and sliding it on the transfer sleeve, the pipe protector is then ready to be installed on the drill pipe. A hydraulic pressured gun is usually used to transfer the pipe protector from the transfer sleeve to the pipe joint or area.

The installtion units of the prior art are hydraulic. Some use water pressure which limits the pressure to 250 psi. Other units use a hydraulic system with a cylinder that pressurizes the fluid to 1000 psi. The hydraulic units have a typical piston and cylinder arrangement.

The shaft extends through a spider plate which is mounted on the cylinder. A rubber bumper rests on the mounting of the spider plate. The installation unit is loaded with a pipe protector, transfer cone and transfer sleeve respectively on the shaft. The parts are secured on the shaft with a collar or plate placed just above the transfer sleeve.

The piston is actuated by the inflow of hydraulic fluid to move downwardly in the cylinder. As the piston moves down, the transfer cone is forced into the pipe protector. The taper of the cone permits it to slide into the inner diameter of the pipe protector and as the piston moves downward it forces the larger diameter of the cone into the pipe protector thereby stretching the internal diameter of the pipe protector.

The pipe protector then is forced over the transfer sleeve which is approximately the same diameter as the largest diameter of the cone. During the downward movement the spider plate contacts the circumference of the transfer cone. The pipe protector maintains a position to top of the spider plate as it is forced over the cone and sleeve. The spider plate expands around the taper of the cone during operations. In the prior art one spring circles the outside of the spider plate.

After the pipe protector was forced over the transfer sleeve the collar or plate securing the operating parts on the shaft is removed. The transfer sleeve loaded with the pipe protector is ready for use.

SUMMARY OF THE PRESENT INVENTION

The present invention has advantages over the prior art which provide a more efficient, lower weight and versatile improved pipe protector installation device. The device is used for installation of the same type of pipe protectors. About twice as many protectors can be installed with the same manpower as the prior art hydraulic fluid units and about three times as many as compared to the water units.

The present invention utilizes a hydraulic fluid 4 inch piston which achieves at least 2000 psi instead of the 1000 psi of the prior art hydraulic fluid unit and the 250 psi of the 12⅞ inch single action water piston. The improved installation unit has a double action piston with the smaller cylinder which achieves more hydraulic pressure and is lighter weight. The improved unit is easier to transport around a well site.

The improved unit has a recoil spring instead of a rubber bumper resting on the spider plate mounting on the cylinder. In the prior art as the downward stroke of the piston was being completed and the pipe protector had been transferred from the cone to the sleeve, the cone would be forced into the rubber bumper. The rubber bumper was acting as a retaining part to prevent the transfer cone from being forced onto the cylinder during operation. To reuse the cone it would often have to be pried out of the rubber bumper. This would after time require the replacement of the rubber bumper. In the improved unit a recoil spring is confined between the top of the cylinder and the bottom surface of the spider plate. The transfer cone contacts the spring during the downward stroke and compresses the spring without any damage to the recoil spring.

Another problem which also contributed to the cone embedding in the rubber bumper is the design of the spider plate. In the prior art one spring surrounds the spider plate with the series of circular pushers and shoes. The spring would roll off during operation as the spider plate expanded. In the improved device the shoes are connected to each adjacent shoe with an individual spring. The springs are secure and do not roll during operation. After transfer of a pipe protector to a transfer sleeve, the spider plate returns to the position ready for another installation procedure.

The improved pipe protector installation unit can be driven by a number of available sources. The unit can be powered by electric, gasoline or explosion proof electric motors.

BRIEF DESCRIPTION OF THE DRAWINGS

FIG. 1 is a perspective view of the improved pipe protector installation device with phantomed internal parts.

FIG. 2 is a detail perspective view of a pusher shoe.

DESCRIPTION OF THE PREFERRED EMBODIMENT

Figure 3:
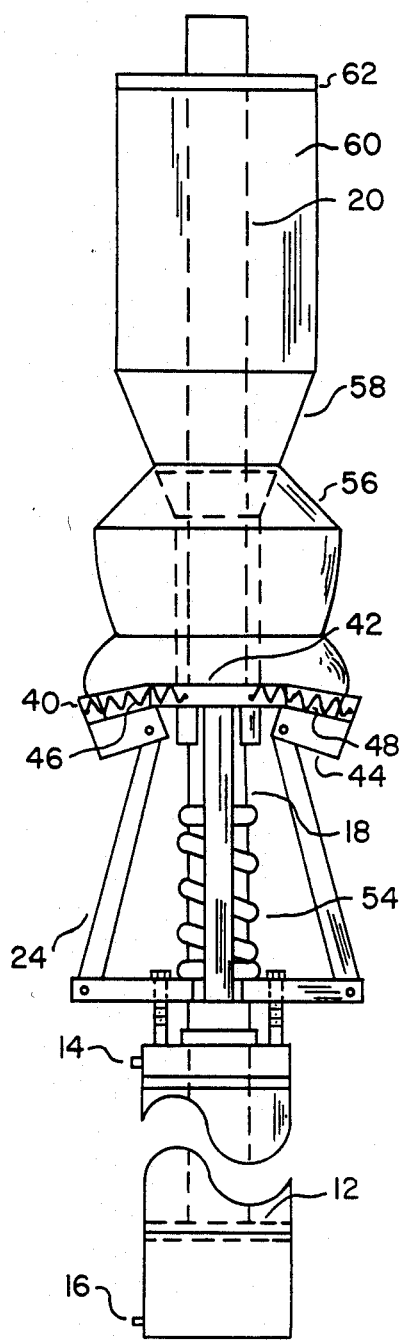
FIG. 3 is a perspective view of the improved pipe protector in operation with phantomed internal parts.

A pipe protector installation unit of this invention is shown in FIG. 1 loaded and ready for operation. The hydraulic cylinder 10 is fitted with piston 12. The cylinder 10 has upper port 14 and lower port 16 for providing and drawing hydraulic fluid from the cylinder 10 to operate piston 12.

Piston shaft 18 extends upwardly from and outside the cylinder 10. The piston has a seal 64 around shaft 18. A shaft extension 20 is threaded to piston shaft 18 at threaded connection point 19. Shaft extension 20 is generally the same diameter of piston shaft 18. A collar 22 mounted on top of cylinder 10 surrounds piston shaft 18 at the point it extends from the top of the cylinder 10.

Spider plate 24 is mounted on top of cylinder 10. The spider plate 24 has several components. A circular stage 26 with a central opening is mounted directly to the top of the cylinder 10 with several bolts shown as 27 and 28 in FIG. 1. Piston shaft 18 and collar 22 extend through the central opening in the stage 26.

A number of pusher legs are attached pivotly to the perimeter of stage 26. In the preferred embodiment four pusher legs are used. As shown in FIG. 1 pusher legs 30, 32 and 34 extend upwardly from the state 26 and the pin pivot hinge 36 and 38 are shown on pusher leg 30 and 34 attachment to the stage 26. The fourth pusher leg is obstructed from view in FIGS. 1, 3 and 4, but is constructed in the same manner described herein.

The end of the pusher legs opposite to stage 26 are attached with a pin pivotly to pusher shoes. The pusher shoes are generally wedge shaped. FIG. 1 shows three pusher shoes 40, 42 and 44 attached pivotly to pusher legs 30, 32, and 34 respectively. There are four pusher shoes in the preferred embodiment. The wedge shape pusher shoes are curved to form a circular arrangement. As shown in FIG. 1 the pusher shoes surround the piston shaft 18.

The pusher shoes cooperate to tightly surround the piston shaft 18 in the center of the shoes through support of the pusher legs 30, 32 and 34 (as shown in FIG. 1) and by springs attached from each pusher shoe to either adjacent pusher shoe. As an example, in FIG. 1 pusher shoe 42 is attached by spring 46 and to shoe 40 and by spring 48 to shoe 44. The pusher shoes springs shown in FIG. 1 are attached to eyelets 43, 45, 47 and 49 on the outside of the pusher shoes. Each pusher shoe is attached by a separate spring to each adjacent shoe. Under pressure on the pusher shoes the spring will expand. The pusher shoes are attached pivotly to the pusher legs and as shown in FIG. 1 the shoes 40 and 44 will rotate and open in cooperation with the pivot connections 50 and 52. The pivot connection of shoe 42 cannot be seen on FIG. 1.

FIG. 2 is a detail perspective view of one of the pusher shoes. The pusher shoe is wedge shape with a curved inner surface 100 and curved outer surface 102. The inner surface 100 contacts the shaft extending from the piston in the loaded configuration shown in FIG. 1. The inner surface has a lip 104 which extends upwardly from the surface. The shoe has a slot opening 106 on the bottom of the shoe which is sized to receive the upper end of a pusher leg. The lower portion of the shoe on either side of the slot has pivot pin openings 108 and 110. The two eyelets for the pusher shoe spring connection are on outer surface 102 and are obstructed from view in FIG. 2.

Recoil spring 54 sized to be received around the piston shaft 18 or shaft extension 20 is shown in FIG. 1 resting on collar 22 and extending to the pusher shoes 40, 42, and 44. The recoil spring 54 is compressed during operation.

FIG. 1 shows a typical pipe protector 56 loaded on the shaft extension 18. The shaft extension 18 diameter is sized so that the pipe protector 56 can slide on fairly easily.

In FIG. 1 transfer cone 58 is shown in the loaded placement above pipe protector 56. Transfer cone 58 has a generally cylindrical opening through the center which is sized so that transfer cone can slide onto shaft extension 20 as shown in FIG. 1. The transfer cone is tapered in outside diameter from smaller of the internal diameter of the central opening of the pipe protector to larger than the outside diameter of the pipe surface to be covered.

Transfer sleeve 60 is a mandrel type cylinder with a smooth or low friction outer surface. Transfer sleeve 60 has a cylindrical opening in the center allowing it to slide over shaft extension 20. The diameter of transfer sleeve 60 is larger than the diameter of the pipe surface to be covered with the pipe protector. It is generally the same size as the widest diameter of the transfer cone 58.

The pipe protector 56, transfer cone 58 and transfer sleeve 60 are secured on piston shaft 18 and its shaft extension 20 during operation. In FIG. 1 a holddown plate 62 performs this function. In FIG. 1 the holddown plate 62 is a collar type part which fits into a groove on the shaft extension 20 above the transfer sleeve 60.

FIG. 1 shows the improved pipe protector installation device in the loaded position to begin operation. The cylinder has been filled with hydraulic fluid below the piston through port 16. Piston 12 is in the extended position so that piston shaft 18 extends outwardly from the cylinder 10. The spider plate 24 and pusher legs surround the piston shaft 18 and shaft extension. Pipe protector 56, transfer cone 58 and transfer sleeve 60 have been loaded respectively on piston shaft 18 and its shaft extension 20. The parts have been secured on piston shaft 18 and shaft extension 20 by holddown plate 62.

In operation hydraulic fluid is pumped into port 14 and drained out of port 16 with piston 12 operating in downstroke mode. The force on the piston to operate in the efficient manner is at least 2000 psi. As the piston 12 moves downwardly the rubber pipe protector 56 is forced over the cone, initially at the small taper of the diameter and eventually over the larger taper of the diameter.

Figure 4:
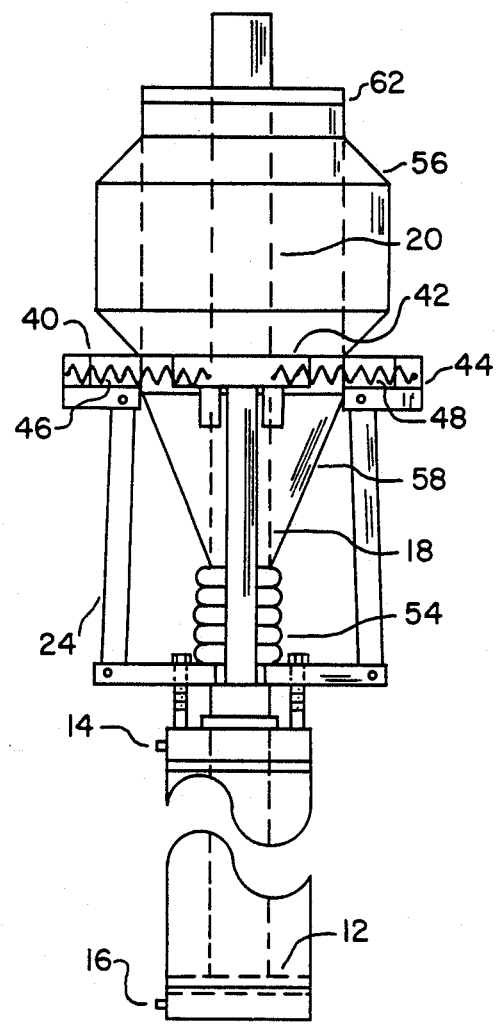
FIG. 4 is a perspective view of the improved pipe protector after transfer of a pipe protector to a transfer sleeve with phantomed internal parts.

FIG. 3 shows an intermediate pointin operation with the piston 12 in downstroke mode. The transfer cone 58 is forced into the pipe protector 56. During this process the rubber pipe protector 56 is usually compressed and deformed as shown in FIG. 3. During this process the pusher legs and pusher shoes pivot outwardly so that the pusher shoes enlarge the central opening. The degree of enlargement of the central opening and degree of pivot depend on the size of the pipe protector being transferred. FIG. 3 and FIG. 4 show the opening of the spider 24 plate with FIG. 4 in a fully open position and the shoes rotated on the pivot connection to the pusher legs. The springs connecting the pusher shoes expand also during the operation. The cooperation of the pusher legs, pusher shoes and springs connecting the pusher shoes hold the pipe protector firmly in place as the transfer cone 58 is forced in the central opening of the pipe protector 56.

As the piston further moves in the downstroke, the pipe protector 56 is forced over the surface of transfer cone 58 and onto transfer sleeve 60. Deformation of the pipe protector continues. As the pipe protector 56 is being forced over transfer sleeve 60, transfer cone 58 extends through the central opening of the pusher shoes of spider plate 24 and contacts recoil spring 54.

The downstroke of piston 12 continues until pipe protector 56 has been stretched and forced over transfer sleeve 60. FIG. 4 shows the pipe protector 56 transferred to transfer sleeve 60. The recoil spring 54 is compressed by the compressive force of the transfer cone 58 moved downwardly with the piston action. The pipe proector 56 internal diameter has been stretched in order to be carried by transfer sleeve 60.

The action on the piston is then reversed so that hydraulic fluid is pumped into port 16 and drained from port 14 on cylinder 10. The piston then operates in an upstroke mode. During this operation the compressed recoil spring 54 is relaxed as the transfer cone 58 moves upwardly with the movement of piston shaft 18 and shaft extension 20. The spider plate returns to position around the piston shaft 18. The holddown plate 62 is removed and the transfer sleeve 60 holding stretched pipe protector 56 is removed and ready for installation on pipe surface to be protected. The transfer cone 58 is also removed.

To perform the next opeation another pipe protector is placed on shaft extension 18 followed by transfer cone 58 and another transfer sleeve and the operation is repeated as described above.

The foregoing description of the preferred embodiment is not intended to limit the scope of the claimed invention.

What is claimed is:

1. An improved pipe protector installation tool comprising
    a reciprocating hydraulic piston and cylinder with at least two ports for hydraulic fluid located at opposite ends of the cylinder;
    a shaft extension which can be attached to the piston shaft;
    a spider plate with a generally circular stage mounted to the piston end of the cylinder with the stage having a generally circular opening through which the piston can move, a plurality of pusher legs and shoes each leg pivotly attached at one end to the stage and at the other end pivotly attached to a wedge shaped shoe;
    a plurality of springs attaching each shoe to each adjacent shoe;
    a recoil spring received around either of the piston shaft or shaft extension and retained in place by resting or compression on said stage;
    a transfer cone with a generally cylindrical opening through the center sized to slide through either the piston shaft or shaft extension, said
    transfer cone taper varying in outside diameter from smaller of the diameter of the internal diameter of a pipe protector to larger than the outside diameter of the pipe surface to be covered;
    a transfer sleeve with a smooth outer surface with a diameter larger than the diameter of the pipe surface to be covered with the pipe protector;
    means to secure the pipe protector, transfer cone and transfer sleeve on the piston shaft and shaft extension; and
    said plurality of wedge shaped shoes cooperating to form a circular arrangement surrounding either of said piston shaft or shaft extension in the center of said shoes so that when the tool is loaded with the pipe protector, transfer cone and transfer sleeve on said shaft extension in the respective order, and secured, and the hydraulic piston is actuated to move down in the cylinder forcing the transfer cone and subsequently the transfer sleeve into the inner diameter of the pipe protector forcing the circular opening of the wedge shape shoes to expand to surround tightly said transfer cone and transfer sleeve through the pivot action of the legs and the expansion of the plurality of springs.

2. An improved pipe protector installation tool of claim 1 wherein said means to secure the pipe protecter, transfer cone and transfer sleeve loaded on said shaft extension respectively is a holddown plate secured on said shaft extension just above the transfer sleeve.

3. An improved pipe protector installation tool of claim 1 wherein said hydraulic piston and cylinder can pressurize fluid to at least 2000 psi.

* * * * *